(12) United States Patent
Yazdy

(10) Patent No.: US 7,649,544 B2
(45) Date of Patent: Jan. 19, 2010

(54) METHOD AND SYSTEM FOR IMPROVED RASTER OUTPUT SCAN CONTROL IN AN ELECTROPHOTOGRAPHIC SYSTEM

(75) Inventor: Mostafa R. Yazdy, Los Angles, CA (US)

(73) Assignee: Xerox Corporation, Norwalk, CT (US)

( * ) Notice: Subject to any disclaimer, the term of this patent is extended or adjusted under 35 U.S.C. 154(b) by 1006 days.

(21) Appl. No.: 11/091,787

(22) Filed: Mar. 25, 2005

(65) Prior Publication Data

US 2006/0215188 A1 Sep. 28, 2006

(51) Int. Cl.
*B41J 2/435* (2006.01)

(52) U.S. Cl. ....................... 347/247; 347/237

(58) Field of Classification Search ................. 347/247, 347/237
See application file for complete search history.

(56) References Cited

U.S. PATENT DOCUMENTS

| | | | |
|---|---|---|---|
| 5,091,971 A * | 2/1992 | Ward et al. | 382/266 |
| 5,291,318 A | 3/1994 | Genovese | |
| 5,381,165 A | 1/1995 | Lofthus et al. | |
| 5,485,195 A | 1/1996 | Nacman | |
| 5,517,230 A | 5/1996 | Lofthus et al. | |
| 5,606,648 A | 2/1997 | Walther | |
| 5,651,017 A | 7/1997 | Genovese | |
| 5,764,377 A * | 6/1998 | Nacman et al. | 358/444 |
| 5,835,121 A | 11/1998 | Genovese et al. | |
| 6,310,681 B1 * | 10/2001 | Taniwaki | 355/55 |
| 6,700,594 B1 * | 3/2004 | McCormick et al. | 347/116 |
| 2001/0012115 A1 * | 8/2001 | Kajiwara et al. | 358/1.13 |

FOREIGN PATENT DOCUMENTS

| | | |
|---|---|---|
| EP | 1241869 A2 | 9/2002 |
| JP | 2004233717 A | 8/2004 |

OTHER PUBLICATIONS

EP Search Report, European Patent Office, Munich, Germany, Jul. 17, 2008.

\* cited by examiner

*Primary Examiner*—Stephen D Meier
*Assistant Examiner*—Sarah Al-Hashimi
(74) *Attorney, Agent, or Firm*—Maginot, Moore & Beck

(57) ABSTRACT

An improved ROS driver circuit for an electrophotographic printing system includes a sub-pixel clock generator, a parallel to serial converter, and a raster output scanner (ROS) light source. The sub-pixel clock generator generates a sub-pixel clock signal that has a period less than a period of a video data clock and this clock signal is used by the parallel to serial converter to convert a parallel video data stream into a serial video data bit stream. The serial video data bit stream modulates the ROS light source to provide sub-pixel control of the light signal generated by the ROS light source.

17 Claims, 4 Drawing Sheets

METHOD AND SYSTEM FOR IMPROVED RASTER OUTPUT SCAN CONTROL IN AN ELECTROPHOTOGRAPHIC SYSTEM

TECHNICAL FIELD

The present invention relates generally to electrophotographic printing machines, and more particularly, to raster output scanners in electrophotgraphic printing machines.

BACKGROUND

Generally, the process of electrophotographic printing includes charging a photoconductive member to a substantially uniform potential to sensitize its surface. The charged portion of the photoconductive surface is exposed to a light image from a scanning laser beam or a LED diode that corresponds to an original document or image being reproduced. The effect of the light on the charged surface produces an electrostatic latent image on the photoconductive surface.

After the electrostatic latent image is recorded on the photoconductive surface, the latent image is developed. Two-component and single-component developer materials are commonly used for development. A typical two-component developer comprises a mixture of magnetic carrier granules and toner particles that adhere triboelectrically to the latent image. A single-component developer material is typically comprised of toner particles without carrier particles. Toner particles are attracted to the latent image, forming a toner powder image on the latent image of the photoconductive surface. The toner powder image is subsequently transferred to a copy sheet. Finally, the toner powder image is heated to permanently fuse it to the copy sheet to form the hard copy image.

In color electrophotographic printers, one or more ROS units are positioned adjacent to a moving photoreceptor belt surface or the like and are selectively energized to generate successive image exposures. Each of the latent images is representative of one of a plurality of different color separation images. Development of the color separation latent images and the transfer of the developed image to an output media define a multi-color image. The color separation images may define, for example, yellow, magenta, cyan, and black color images that, upon subtractive combination on the output media, produce a visible representation of the multi-color image. When an observer looks at the output media, the human eye integrates the light reflections from the color component images into shades of color.

For a color imaging cycle, the printer generates a component image exposure for each color component of the desired output image. For full color images, four component images may be generated, one component image for each of the three basic colors and a fourth for black images. Each component image is transferred to the moving photoconductive surface by modulating the light source of an ROS as it moves across the moving photoconductor to selectively discharge the photoconductor in an image-wise pattern. The modulation control of the laser or LED of the ROS is provided by the video data. For each color component image, the value of an image data byte is used to enable or disable the laser or LED that illuminates the photoreceptor for one pixel timing period. If the data value is less than a threshold value, the LED or laser is not operated for one pixel period. If the data value indicates that a pixel is to be generated, then the LED or laser is operated for one pixel period.

An ROS that generates a series of pixels comprising a color component image places the color component image it generates in overlying registration with the other color component images. These overlapping images are composed of a series of closely spaced pixels that are nominally spaced 5 microns apart. When these component images are developed at development stations to transfer toner particles of different colors to the component images, a composite color image is formed. This composite color image is then transferred to an output sheet. Thus, the quality of color image perceived by the observer relies upon the precise registration of the component image pixels.

In some electrophotographic imaging systems, the latent images of the component image are formed and developed on top of one another in a common imaging region of the photoconductor. The latent images generated in the common imaging region may be formed and developed during multiple passes of the photoconductor around a continuous transport path. Alternatively, the latent images can be formed and developed in a single pass of the photoconductor around the continuous transport path. A single-pass system enables multi-color images to be assembled at extremely high speeds. In either type of imaging systems, accurate placement of the color separation image pixels in the latent image is important for image quality.

One problem with the pixels generated by these types of ROS devices is the lack of precision regarding the size and placement of the pixels. Because the entire data byte is mapped to only one value, either an on or off value, only one of two types of pixels may be produced. Therefore, the data bytes for an image may define pixels of different densities, but the ROS is only able to generate a pixel that is either on for the full duration of a pixel clock cycle or off for the same period of time. Consequently, some of the data content for an image is lost in the process of generating a latent image from a set of image data.

A few methods are known for improving the registration of the color component images. One method involves mechanically "steering" the photoreceptor belt for placement of pixels on the photoreceptor surface. The registration system disclosed in U.S. Pat. No. 5,737,003 describes a registration system that includes a scan control system that, based on the detected position, controls the modulation of laser beams scanned to form latent images on the photoconductor belt. This system, however, is mechanically complex and still only produces two types of pixels.

What is needed is a way of improving pixel placement without requiring mechanically complex control of the scanning system.

What is needed is a way of adjusting pixel values to preserve more of the color density information in the data values for the color component images.

SUMMARY

The above-described limitations of development systems in known electrophotographic machines are addressed by a system and method that precisely controls the modulation of the laser or LED used for generating a latent image on a photoreceptive surface. The control system includes a sub-pixel clock generator for generating a sub-pixel clock signal that has a period less than a period of a video data clock, a parallel to serial converter for converting a parallel video data stream into a serial video data bit stream, the parallel to serial converter being coupled to the sub-pixel clock signal for serially outputting the video data bit stream, and a raster output scanner (ROS) light source coupled to the output of the parallel to serial converter for sub-pixel control of a light signal generated by the ROS light source. The size or intensity of the pixel corresponds to the number of bits in a video data word that correspond to turning on the ROS light source and the resolution of the pixel content depends upon the position of the bits that activate the ROS light source during a pixel clock signal period. Therefore, the control system provides more precise generation of pixels in the latent image formed by an ROS light source on a photoreceptor surface. Furthermore, the improved control system enables pixels having a wider range of values than just two to be generated.

An improved method for driving a raster output scanner comprises generating a sub-pixel clock signal that has a period less than a period of a video data clock, converting a parallel video data stream into a serial video data bit stream, serially outputting the video data bit stream in synchronization with the sub-pixel clock, and modulating a raster output scanner (ROS) light source with the video data bit stream for sub-pixel control of a light signal generated by the ROS light source. By modulating an ROS light source with each data bit of a video data word during the clock period for a single video data word, latent image pixels are generated with more precision.

The above described features, as well as others, will become more readily apparent to those of ordinary skill in the art by reference to the following detailed description and accompanying drawings.

BRIEF DESCRIPTION OF THE DRAWINGS

By way of example, an embodiment of the invention will be described with reference to the accompanying drawings, in which.

DETAILED DESCRIPTION

Figure 1:
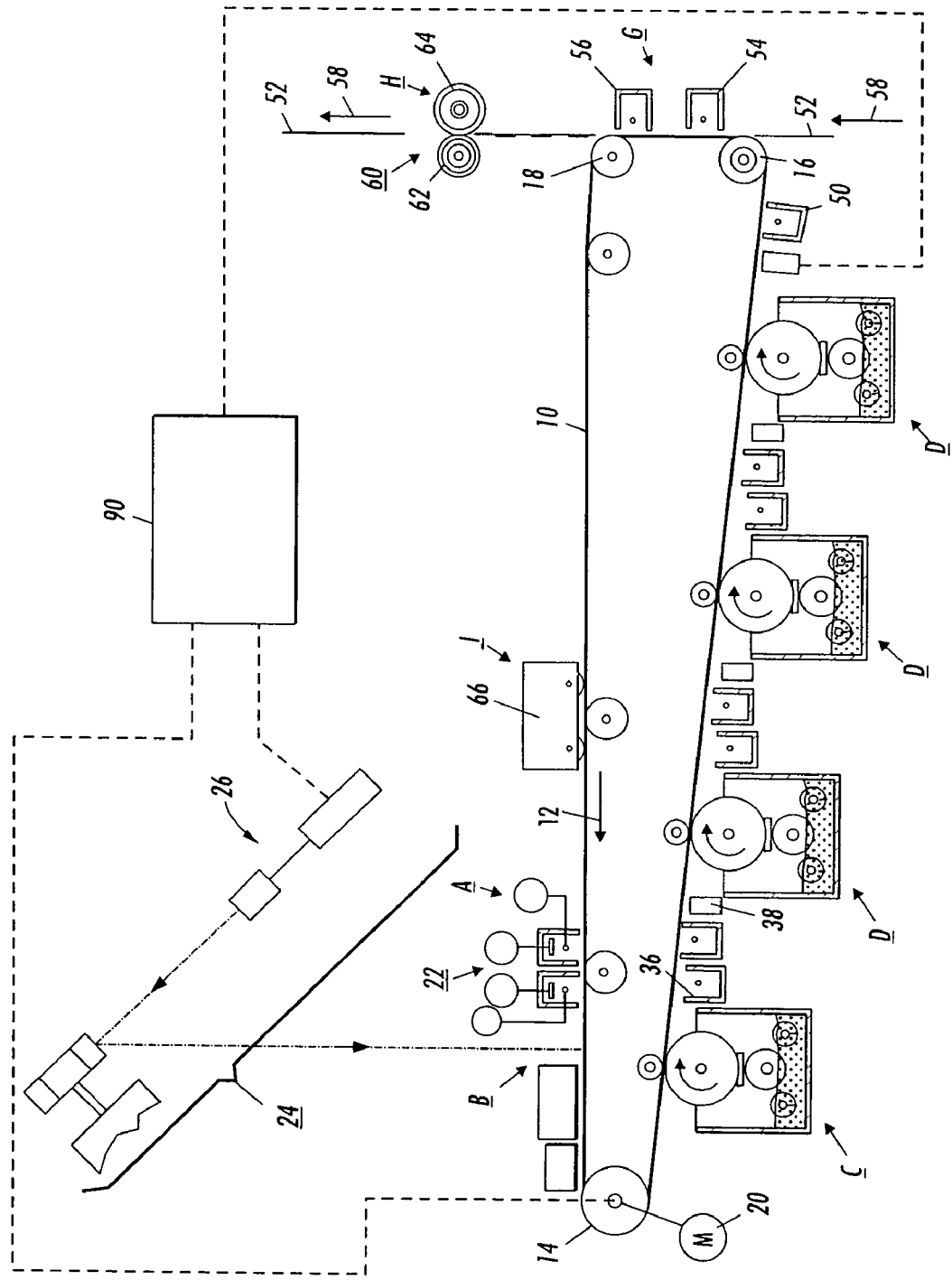
FIG. 1 is a schematic elevational view depicting an illustrative electrophotographic printing machine.

In the drawings, like reference numerals have been used throughout to designate identical elements. FIG. 1 schematically depicts the various components of an illustrative electrophotographic printing machine incorporating an ROS control apparatus that uses a video data stream for sub-pixel generation. This ROS control apparatus is also well suited for use in a wide variety of electrostatographic printing machines and for use in ionographic printing machines. Because the various processing stations employed in the FIG. 1 printing machine are well known, they are shown schematically and their operation is described only briefly.

FIG. 1 depicts an electrophotographic printing machine in which the ROS operation may be controlled with at least one video data stream. The machine includes a charge retentive surface in the form of an Active Matrix (AMAT) photoreceptor belt 10 supported for movement in the direction indicated by arrow 12 so it sequentially advances through the various electrophotographic process stations. The belt is entrained about a drive roller 14, tension roller 16 and fixed roller 18. The roller 14 is operatively connected to a drive motor 20 for moving the belt through the electrophotographic stations.

With continued reference to FIG. 1, a portion of belt 10 passes through charging station A where a corona generating device, indicated generally by the reference numeral 22, charges the photoconductive surface of belt 10 to a relatively high, substantially uniform, preferably negative potential. Next, the charged portion of photoconductive surface is advanced through an imaging station B. At exposure station B, the uniformly charged belt 10 is exposed to a laser based output scanning device 24 that causes the charge retentive surface to be selectively discharged. The laser of device 24 is driven in accordance with the video data signals received from controller 90. The scanning device 24 includes a laser Raster Output Scanner (ROS) 26.

The photoreceptor 10, which is initially charged to a voltage $V_0$, undergoes dark decay to a level $V_{ddp}$ equal to about −500 volts. The areas receiving the laser output at the exposure station B are discharged to $V_{expose}$, which is typically equal to about −50 volts. Thus, after exposure, the photoreceptor 10 contains a monopolar voltage profile of high and low voltages, the former corresponding to charged areas and the latter corresponding to discharged or background areas.

At a first development station C, a developer housing utilizes a hybrid scavengeless development (HSD) system. The HSD system includes a development roll, better known as the donor roll, and is powered by several development fields (potentials across an air gap). The first field is the wire ac field which is used for toner cloud generation. The second field is the dc development field which is used to control the amount of developed toner mass on the photoreceptor. Other ac and dc fields between the donor, wires, and photoreceptor may be used by skilled practitioners of the art to minimize image defects and change the TRC response to the actuators. The toner cloud causes charged toner particles to be attracted to the electrostatic latent image. Appropriate developer biasing is accomplished via a power supply. This type of system is a non-contact type in which only toner particles are attracted to the latent image and there is no mechanical contact between the photoreceptor and a toner delivery device to disturb a previously developed, but unfixed, image.

A corona recharge device 36 having a high output current vs. control surface voltage (I/V) characteristic slope is employed for raising the voltage level of both the toned and un-toned areas on the photoreceptor to a substantially uniform level. The recharging device 36 serves to recharge the photoreceptor to a predetermined level. A second exposure or imaging device 38, which comprises a laser based output structure, such as the scanning device 24, is utilized for selectively discharging the photoreceptor on toned areas and/or bare areas, pursuant to the image to be developed with the second color developer. At this point, the photoreceptor contains toned and un-toned areas at relatively high voltage levels and toned and un-toned areas at relatively low voltage levels. These low voltage areas represent image areas which are developed using discharged area development (DAD). To this end, a negatively charged, developer material comprising color toner is employed. The toner, which by way of example, may be yellow, is contained in a developer housing structure disposed at a second developer station D and is presented to the latent images on the photoreceptor by way of a second HSD developer system. A power supply (not shown) serves to electrically bias the developer structure to a level effective to develop the discharged image areas with negatively charged yellow toner particles.

The above procedure is repeated for a third imager for a third suitable color toner such as magenta and for a fourth imager and suitable color toner such as cyan. The exposure control scheme described below may be utilized for these subsequent imaging steps. In this manner a full color composite toner image is developed on the photoreceptor belt. To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack of copy sheets. The feed rolls rotate so as to advance the uppermost sheet from stack into a chute that directs the advancing sheet of support material into contact with photoconductive surface of the belt 10 in a timed sequence so that the toner powder image developed thereon contacts the advancing sheet of support material at transfer station G. Transfer station G includes a transfer dicorotron 54 that sprays positive ions onto the backside of sheet 52 to attract the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H. Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52 after it is allowed to cool. After fusing, a chute, not shown, guides the advancing sheets 52 to a catch tray, not shown, for subsequent removal from the printing machine by the operator.

After the sheet of support material is separated from the photoconductive surface of belt 10, the residual toner particles carried by the non-image areas on the photoconductive surface are removed at cleaning station I with a cleaning brush structure contained in a housing 66. The foregoing description is sufficient for the purposes of the present application to illustrate the general operation of a color printing machine for the purposes of describing the ROS control apparatus that uses one or more video data streams.

Figure 2:
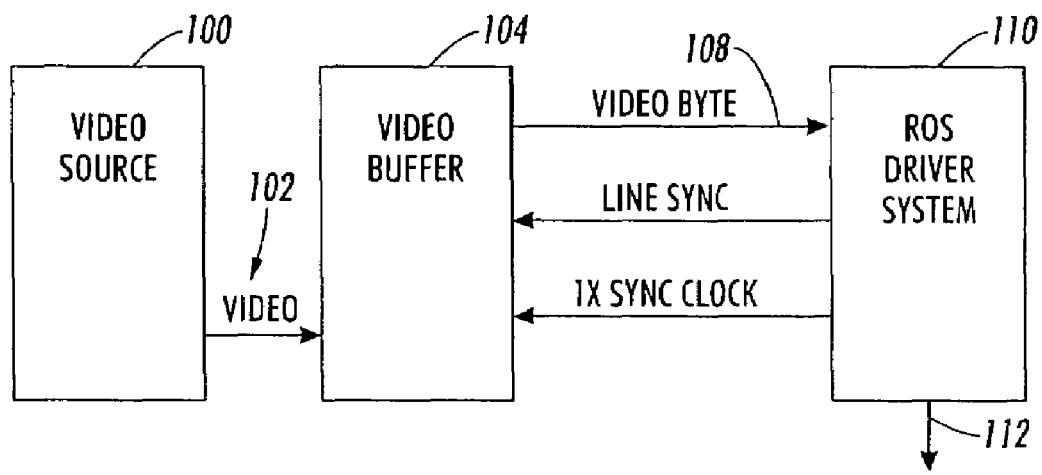
FIG. 2 is a block diagram of a video data input system for providing data to be printed by an electrophotographic printing machine similar to the one shown in FIG. 1.

Referring now to FIG. 2, a video source 100 provides video or other image data 102 to a video buffer 104. The video buffer 104 stores successive 'bytes' of video information, and provides bytes 108, one at a time in a parallel format, to an ROS driver system 110 of an exposure station in an electrophotographic system. The ROS driver system 110 may be part of the controller 90 in FIG. 1 or a separate component. Thus, the light generated by the raster output scanner is modulated by the video bytes. The video data bytes are provided to the ROS driver system 110 in response to a line sync signal 112 and a 1× sync clock signal. The line sync signal 112 is only active during each image line scan while the 1× clock sync is continuous. The video buffer 104 only outputs video data when both the line sync and the clock are active. The ROS driver system 110 outputs a data bit stream 112 to modulate an ROS light source for purposes of exposing pixels on a latent image carried by a photoconductive belt in an electrophotographic system.

Figure 3:
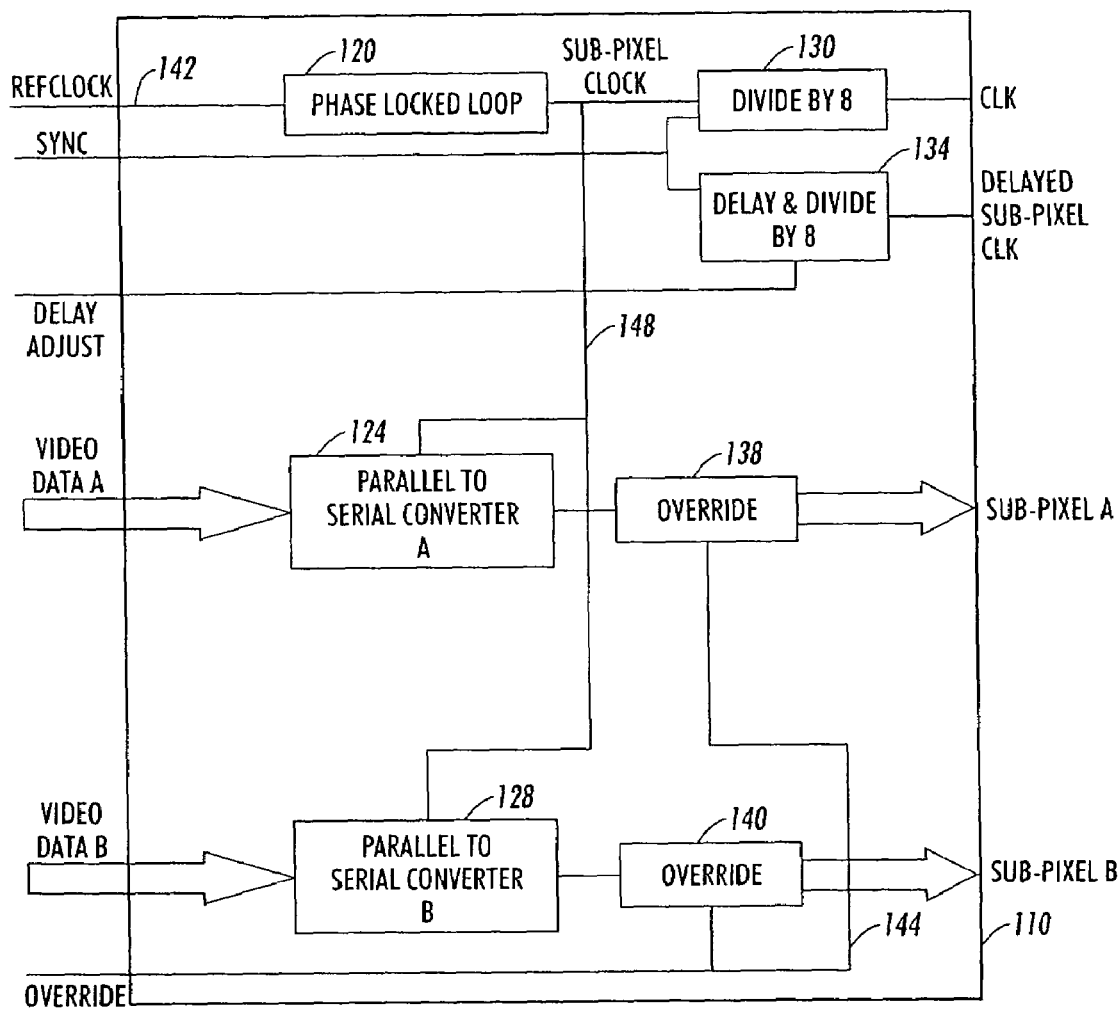
FIG. 3 is a block diagram of the ROS driver that uses the video data from the input system of FIG. 2 to drive an ROS light source.

One embodiment of a ROS driver system 110 is shown in more detail in FIG. 3. The driver system 110 includes a phase locked loop 120, parallel to serial converters 124, 128, a divide by eight counter 130, and a delay and divide by eight counter 134. The inputs of the parallel to serial converters 124, 128 are coupled to the outputs of separate video buffers 14 to receive bytes of image data, such as the video data described above. An image data byte is preferably converted to a serial bit stream with the most significant bit being first in the stream, although the byte may be converted to a bit stream in the reverse order. While the illustrated system is described with reference to eight-bit video input bytes, the principles of the illustrated system are equally applicable to any size input byte. The serial bit streams of the converters 124, 128 may be output to the input of override circuits 138, 140, respectively, as shown in FIG. 3. The override circuits 138, 140 are controlled by an override signal 144. The override circuits 138, 140 are logically equivalent to an OR gate. As long as the override enable signal is a logic low value, the output of the override circuit follows the video bit stream. When the override enable signal is a logic high value, the output of the override circuit remains high.

To convert the successive parallel bytes of image data into a serial data bit streams, the parallel to serial converters are synchronized with a sub-pixel clock signal that is generated by the phase locked loop 120. In order to generate a sub-pixel clock signal 148 to control the parallel to serial conversion of N-bit video bytes, a reference clock signal 142 is synthesized to generate a sub-pixel clock signal having a period that is 1/N of the pixel clock period using a PLL circuit 120. PLL circuit 120 may be implemented in a known manner. For a typical eight-bit data byte application, the reference clock signal is 54 MHz and the sub-pixel clock signal is 432 MHz, although other clock rates and ratios may be used provided the sub-pixel clock rate period is less than the pixel clock signal.

The sub-pixel clock signal is provided to the parallel to serial converters 128, 130 to produce a stream of bits in which each bit is 1/Nth of the time period corresponding to one pixel width in a line scan. When the override circuits 138, 140 are enabled to pass the bit streams on their inputs, each bit stream proceeds to an ROS light source. Consequently, the light source is controlled in sub-pixel increments. For example, if N=8, the period of the sub-pixel clock is ⅛ of the period of the pixel clock and a data byte of "10000000" results in an ROS light source modulation that turns the light source on for ⅛$^{th}$ of a pixel clock period and then off for ⅞ths of the pixel clock period. Continuing the example, a data byte of "00001100" turns the light source off for one-half of the pixel clock period, then on for one quarter of the pixel clock period, and then off again for one quarter of the period. A data byte having the value "11001100 controls the ROS to generate two "on" sub-pixels with a length of one quarter pixel that are separated by two "off" sub-pixels having a length of one quarter pixel. Likewise, for a four bit image data byte, the sub-pixel clock has a period that is one-fourth of the pixel clock and the ROS light is modulated in sixteen different patterns corresponding to the possible data values to generate sub-pixels in a pixel location in a scan line. Therefore, the illustrated system controls the length of time that the ROS light source is illuminated with finer (i.e., sub-pixel) granularity than previously known systems. By enabling the ROS light source to be activated for time periods less than one pixel, the amount of light exposure as well as the placement of the exposure may be more precisely controlled.

In previously known ROS drivers, the ROS light source was turned on or off for full pixel clock periods only. With the illustrated system or one made in accordance with its principles of construction, the amount of pixel exposure may be varied in accordance with the data being image and the sub-pixels may be distributed within a pixel location. A pixel generated from a data bit stream of "11111111" enables more toner to be developed than a data bit stream of "00011100" and color may, therefore, be more accurately defined.

As shown in FIG. 3, more than one video data byte may be provided to the ROS driver circuit 110. The video bytes are input to separate parallel to serial converters 128, 130 that are clocked by the sub-pixel clock from the PLL circuit 120. As a consequence, the video bit streams generated by the two parallel to serial converters are essentially in synchronization and the outputs of the override circuits likewise are essentially synchronized as a result. Therefore, the outputs of the override circuits may be used to drive separate ROS devices. Alternatively, the outputs of the override circuits may be provided to a multiplexer (not shown) so that one serial bit stream or the other may be routed to the ROS light source for modulation purposes. In this alternative embodiment, the output from the video buffers may also be controlled with the line sync and 1× clock signals to occur at different times.

Figure 4:
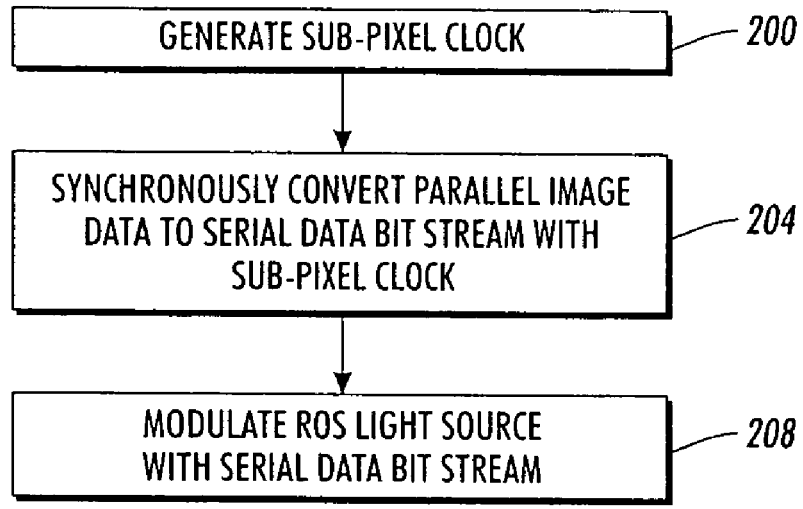
FIG. 4 is a flow diagram of a process for controlling an ROS light source with a video data stream.

An improved method for controlling an ROS light source in an electrophotographic system is shown in FIG. 4. The method includes generating a sub-pixel clock signal that has a period less than a period of a video data clock (block 200) and converting a parallel video data stream into a serial video data bit stream in synchronization with the sub-pixel clock (block 204). Preferably, the sub-pixel clock signal has a period that is 1/N of the pixel clock signal period, where N is the number of bits in a video data byte. The serial video data bit stream is used to modulate a raster output scanner (ROS) light source (block 208). The sub-pixel timing of the light source modulation provides more precise exposure control within a pixel position on a photoreceptor than available with previously known ROS driver systems. The sub-pixel clock signal generation is preferably performed with a phase lock loop circuit to help preserve synchronization between the clock signals used in the electrophotographic system.

Figure 5:
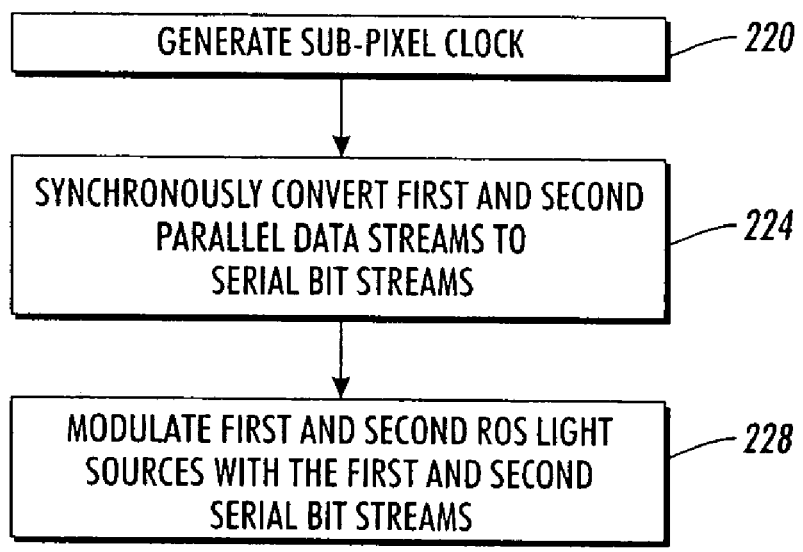
FIG. 5 is a flow diagram of a process for controlling multiple ROS light sources with multiple video data streams.

Another method for improved ROS light source modulation is shown in FIG. 5. This method includes generating a sub-pixel clock signal that has a period less than a period of a video data clock (block 220) and synchronously converting a first parallel video data stream and a second parallel video data stream into a first serial data bit stream and a second serial data bit stream with reference to the sub-pixel clock (block 224). Preferably, the sub-pixel clock signal has a period that is 1/N of the pixel clock signal period, where N is the number of bits in a video data byte. The data bit streams are used to synchronously modulate two ROS light sources for exposing separate color image components at an exposure station for an electrophotographic system (block 228). Alternatively, one of the first serial data bit stream and the second serial data bit stream may be selected to modulate a single ROS light source at different times to expose separate color component images on a photoconductive belt as it makes multiple passes through the electrophotographic system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A photoconductive belt coupled by rollers to a motor for rotation of the belt in an electrophotographic system;
    a charging station for charging a portion of the photoconductive belt to a relatively high, substantially uniform potential;
    an image data buffer for receiving a parallel image data stream;
    an raster output scanner (ROS) driver having a phase lock loop (PLL) circuit and a parallel to serial converter, the PLL circuit, generates a sub-pixel clock signal from a reference clock signal that corresponds to a video data clock signal, the sub-pixel clock signal having a period that is 1/N of a period of the reference clock signal, where N is a number of bits in a data byte of the parallel video data stream, and the parallel to serial converter converts the parallel image data stream to a serial image data bit stream in synchronization with the sub-pixel clock signal;
    an ROS light source modulated by the serial image data bit stream to generate a light directed to the charged portion of the photoconductive belt to form a latent image on the photoconductive belt corresponding to the parallel image data stream used to generate the serial data bit stream;
    the ROS driver further comprising:
    an override circuit coupled between the parallel to serial converter and the ROS light source, the override circuit providing a constant output signal to the ROS light source in response to an override signal;
    a development station for developing a toner image corresponding to the latent image formed on the photoconductive belt;
    a transfer station for transferring the developed toner image from the photoconductive belt onto a media sheet; and
    a fusing station for permanently affixing the transferred toner image to the media sheet.

2. The system of claim 1, wherein the sub-pixel clock generator generates a sub-pixel clock signal having a period that is one eighth of the period of the reference clock signal and a data byte in the parallel video data stream has eight bits.

3. The system of claim 1, the ROS driver further comprising:
    a second parallel to serial converter for converting a second parallel image data stream into a second serial data bit stream, the second parallel to serial converter being coupled to the sub-pixel clock signal for serially outputting the second serial data bit stream.

4. The system of claim 3, the ROS driver circuit further comprising:
    a second raster output scanner (ROS) light source coupled to the output of the second parallel to serial converter for sub-pixel control of a light signal generated by the second ROS light source.

5. A photoconductive belt coupled by rollers to a motor for rotation of the belt in an electrophotographic system;
    a charging station for charging a portion of the photoconductive belt to a relatively high, substantially uniform potential;
    an image data buffer for receiving a parallel image data stream;
    an raster output scanner (ROS) driver having a sub-pixel clock generator configured to generate a sub-pixel clock signal having a period that is 1/N of a period of video data clock signal, where N is a number of bits in a data byte of a parallel video data stream, and two parallel to serial converters coupled to the sub-pixel clock generator, one parallel to serial converter configured to convert a first parallel image data stream into a first serial video data bit stream in substantial synchronization with the sub-pixel clock signal and the other parallel to serial converter configured to convert a second parallel image data stream into a second serial video data bit stream in substantial synchronization with the sub-pixel clock signal;

two ROS light sources, one ROS light source being coupled to one parallel to serial converter and the other ROS light source being coupled to the other parallel to serial converter, the two ROS light sources being modulated by the serial video data bit stream generated by the parallel to serial converter to which the ROS light source is coupled to generate a light directed to the charged portion of the photoconductive belt and form a latent image on the photoconductive belt corresponding to the first and the second parallel image data streams used to generate the first and the second serial video data bit streams;

the ROS driver further comprising:

two override circuits, one override circuit coupled between one parallel to serial converter and the ROS light source coupled to the parallel to serial converter and the other override circuit coupled between the other parallel to serial converter and the ROS light source coupled to the other parallel to serial converter, each override circuit providing a constant output signal to the ROS light source coupled to the override circuit in response to an override signal;

a development station for developing a toner image corresponding to the latent image formed on the photoconductive belt;

a transfer station for transferring the developed toner image from the photoconductive belt onto a media sheet; and a fusing station for permanently affixing the transferred toner image to the media sheet.

6. The system of claim 5 wherein the sub-pixel clock generator of the ROS driver is a phase lock loop (PLL) circuit that generates the sub-pixel clock signal from a reference clock signal that corresponds to the video data clock signal.

7. The system of claim 5, wherein the sub-pixel clock generator generates a sub-pixel clock signal having a period that is one eighth of the period of the reference clock signal and a data byte in the parallel video data stream has eight bits.

8. An electrophotographic system for reproducing images on media comprising:

a photoconductive belt coupled by rollers to a motor for rotation of the belt in an electrophotographic system;

a charging station for charging a portion of the photoconductive belt to a relatively high, substantially uniform potential;

an image data buffer for receiving a parallel image data stream;

an raster output scanner (ROS) driver having a sub-pixel clock generator configured to generate a sub-pixel clock signal that has a period less than a period of a video data clock signal, and a parallel to serial converter coupled to the sub-pixel clock generator to convert the parallel image data stream to a serial image data bit stream in synchronization with the sub-pixel clock signal, the ROS driver also including an override circuit coupled to the parallel to serial converter, the override circuit generating a constant output signal in response to an override signal;

an ROS light source modulated by the serial image data bit stream to generate a light directed to the charged portion of the photoconductive belt to form a latent image on the photoconductive belt corresponding to the parallel image data stream used to generate the serial data bit stream, the ROS light source also being coupled to the override circuit to receive the constant output signal that is generated in response to an override signal;

a development station for developing a toner image corresponding to the latent image formed on the photoconductive belt;

a transfer station for transferring the developed toner image from the photoconductive belt onto a media sheet; and a fusing station for permanently affixing the transferred toner image to the media sheet.

9. The system of claim 8 wherein the sub-pixel clock generator of the ROS driver is a phase lock loop (PLL) circuit that generates the sub-pixel clock signal from a reference clock signal that corresponds to the video data clock signal.

10. The system of claim 9, wherein the sub-pixel clock generator generates a sub-pixel clock signal having a period that is 1/N of a period of the reference clock signal, where N is a number of bits in a data byte of the parallel video data stream.

11. The system of claim 8, wherein the sub-pixel clock generator generates a sub-pixel clock signal having a period that is one eighth of the period of the reference clock signal and a data byte in the parallel image data stream has eight bits.

12. The system of claim 8, the ROS driver further comprising:

a second parallel to serial converter for converting a second parallel image data stream into a second serial data bit stream, the second parallel to serial converter being coupled to the sub-pixel clock signal for serially outputting the second serial data bit stream.

13. The system of claim 12, the ROS driver circuit further comprising:

a second raster output scanner (ROS) light source coupled to the output of the second parallel to serial converter for sub-pixel control of a light signal generated by the second ROS light source.

14. An electrophotographic system for reproducing images on media comprising:

a photoconductive belt coupled by rollers to a motor for rotation of the belt in an electrophotographic system;

a charging station for charging a portion of the photoconductive belt to a relatively high, substantially uniform potential;

an image data buffer for receiving parallel image data streams; an raster output scanner (ROS) driver having a sub-pixel clock generator configured to generate a sub-pixel clock signal that has a period less than a period of a video data clock signal, and two parallel to serial converters coupled to the sub-pixel clock generator, one parallel to serial converter configured to convert a first parallel image data stream into a first serial video data bit stream in substantial synchronization with the sub-pixel clock signal and the other parallel to serial converter configured to convert a second parallel image data stream into a second serial video data bit stream in substantial synchronization with the sub-pixel clock signal, the ROS driver also having two override circuits, one override circuit coupled to one parallel to serial to converter and the other override circuit coupled to the other parallel to serial converter, each override circuit generating a constant output signal in response to an override signal;

two ROS light sources, one ROS light source being coupled to one parallel to serial converter and the override circuit coupled to the parallel to serial converter, and the other ROS light source being coupled to the other parallel to serial converter and the override circuit coupled to the other parallel to serial converter, the two ROS light sources being modulated by the serial video data bit stream generated by the parallel to serial converter to which the ROS light source is coupled to generate a light directed to the charged portion of the photoconductive belt and form a latent image on the photoconductive belt corresponding to the first and the second parallel image data streams used to generate the first and the second serial video data bit streams and each ROS light source receiving the constant output signal from the override circuit coupled to the ROS light source that was generated in response to the override signal;

a development station for developing a toner image corresponding to the latent image formed on the photoconductive belt;

a transfer station for transferring the developed toner image from the photoconductive belt onto a media sheet; and a fusing station for permanently affixing the transferred toner image to the media sheet.

15. The system of claim 14 wherein the sub-pixel clock generator of the ROS driver is a phase lock loop (PLL) circuit that generates the sub-pixel clock signal from a reference clock signal that corresponds to the video data clock signal.

16. The system of claim 14, wherein the sub-pixel clock generator generates a sub-pixel clock signal having a period that is 1/N of a period of the reference clock signal, where N is a number of bits in a data byte of a parallel video data stream.

17. The system of claim 16, wherein the sub-pixel clock generator generates a sub-pixel clock signal having a period that is one eighth of the period of the reference clock signal and a data byte in the parallel video data stream has eight bits.

* * * * *